United States Patent [19]

Woythaler

[11] 4,100,376

[45] Jul. 11, 1978

[54] PILOT TONE DEMODULATOR

[75] Inventor: Saul L. Woythaler, Middletown, R.I.

[73] Assignee: Raytheon Company, Lexington, Mass.

[21] Appl. No.: 757,548

[22] Filed: Jan. 3, 1977

[51] Int. Cl.$^2$ .......................... H04B 1/68; H04B 3/10
[52] U.S. Cl. .......................... 179/15 BP; 179/15 BT; 325/36; 325/49
[58] Field of Search .................... 325/36, 49, 329, 419; 179/15 BP, 15 BT

[56] References Cited

U.S. PATENT DOCUMENTS

| | | | |
|---|---|---|---|
| 3,571,717 | 3/1971 | Monrolin | 325/49 |
| 3,594,651 | 7/1971 | Wolejsza | 325/419 |
| 3,701,023 | 10/1972 | Fang | 325/329 |

Primary Examiner—Kathleen H. Claffy
Assistant Examiner—Kenneth A. Chayt
Attorney, Agent, or Firm—David M. Warren; Joseph D. Pannone; Milton D. Bartlett

[57] ABSTRACT

A communication system for inphase and quadrature modulation of low frequency signals wherein the modulated signal frequency bands lie close to a carrier, the system including a pilot tone having a fixed frequency ratio to the carrier, the system further including a demodulator employing the pilot tone in a phase locked loop for synthesizing a coarse replica of the carrier, a filter incorporating inphase and quadrature channels utilizing the coarse carrier for extracting the actual carrier from the modulated signal spectrum and synchronous detection of the signals by means of the extracted carrier.

3 Claims, 2 Drawing Figures

PILOT TONE DEMODULATOR

BACKGROUND OF THE INVENTION

Systems for the communication of signals having low frequencies, such as music, wherein the signals are modulated on a carrier present a problem in that the spectral lines representing the signal are closely spaced to the carrier spectral line. Synchronous detection of the signals is difficult because of the difficulty in extracting a carrier from signal spectra lying close to the carrier. A pilot tone having a frequency proportional to the carrier, but lying outside the signal transmission band may be employed for synthesizing a carrier. However, atmospheric perturbations introduce frequency and phase dispersion between the pilot tone and the carrier thereby preventing the synthesis of a carrier which is free of unwanted phase shift, this phase shift reducing the precision of the detection.

SUMMARY OF THE INVENTION

The aforementioned problem is overcome and other advantages are provided by a communication system employing a pilot tone bearing a fixed frequency ratio to a carrier and wherein inphase and quadrature signal components are modulated about the carrier, the system incorporating in accordance with the invention a demodulator having a phase locked loop for tracking the pilot tone, the phase locked loop including a frequency synthesizer for regenerating a replica of the carrier which is phase locked to the pilot tone. The demodulator further includes a filter having inphase and quadrature channels utilizing the replica of the carrier for filtering the spectrum of the signal plus carrier to recover the actual carrier. By means of another phase locked loop, inphase and quadrature components of the carrier are obtained for synchronous detection of the modulated signals.

BRIEF DESCRIPTION OF THE DRAWINGS

The aforementioned aspects and other features of the invention are explained in the following description taken in connection with the accompanying drawings wherein.

DESCRIPTION OF THE PREFERRED EMBODIMENT

Figure 1:
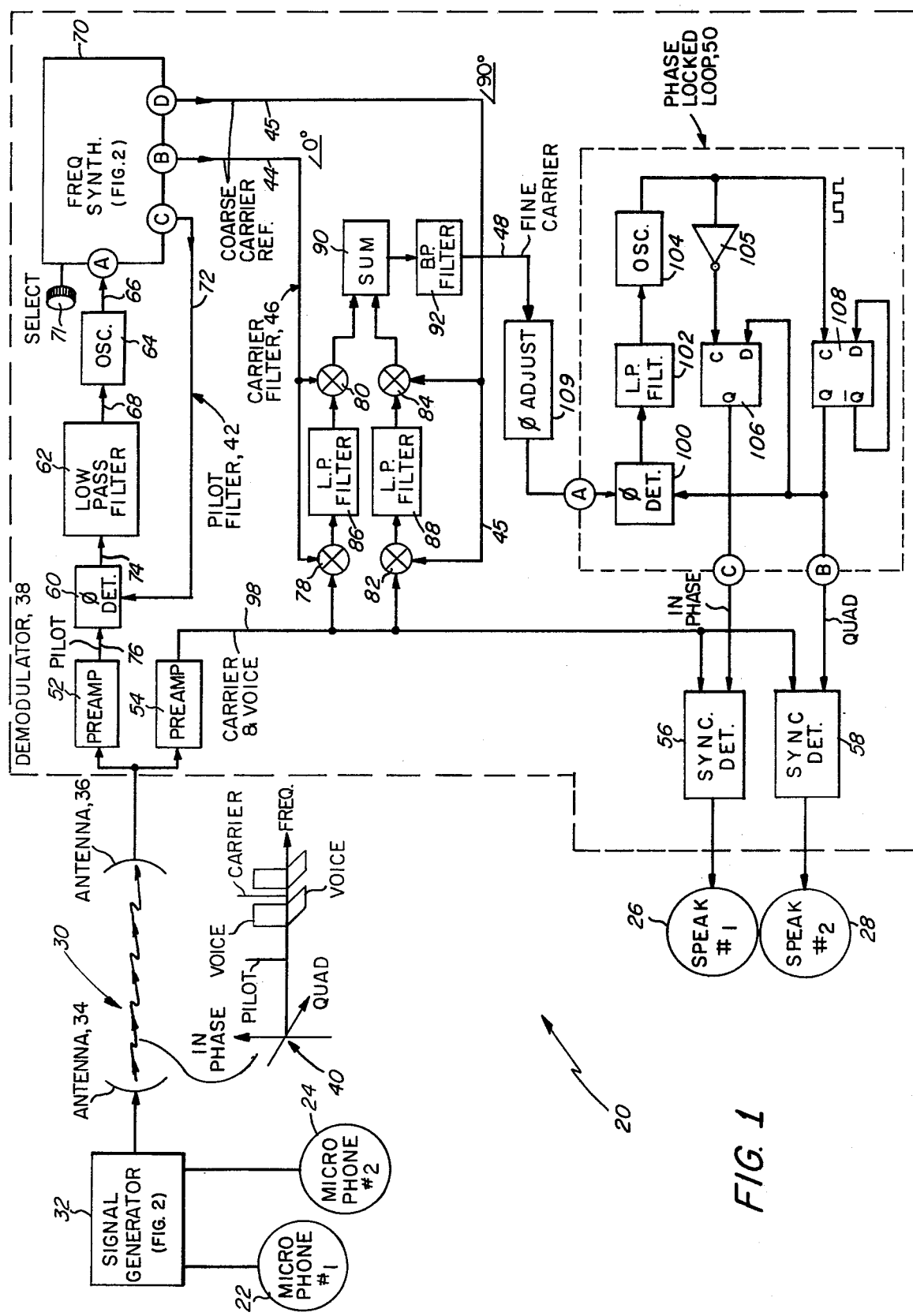
FIG. 1 is a block diagram of a communication system including the generation of a modulated signal with a pilot tone, the transmission of the signal and pilot tone, and the demodulation of the signal in accordance with the invention.

Referring now to FIG. 1, there is seen a block diagram of a system 20 incorporating the invention for transmitting stereophonic music from a pair of microphones 22 and 24 to a pair of speakers 26 and 28. While the system 20 is being demonstrated for the case of stereophonic music, it is understood that the system is particularly adapted for the transmission of signals having frequencies even lower than those of musical instruments, for example, vibrations on the order of 10 Hz, via an atmospheric transmission path 30. A signal generator 32 provides for the modulation of the signals of the microphones 22 and 24 upon a carrier, the generator 32 also providing for the transmission of the carrier with its modulation from an antenna 34 along the path 30 to a receiving antenna 36. A demodulator 38 coupled to the antenna 36 demodulates the carrier and presents the signals of the microphones 22 and 24 respectively to the speakers 26 and 28.

The signals transmitted along the path 30 is shown in a graph 40 which portrays the inphase and quadrature spectra of the signal. As will be described with reference to FIG. 2, the voice signal received by the first microphone 22 is amplitude modulated via a double sideband modulator about the carrier spectral line. The voice signal received by the second microphone 24 is amplitude modulated in quadrature to the voice signal of the first microphone 22 by a double sideband, suppressed carrier modulator. In addition, a pilot tone lying outside the voice spectrum is transmitted along the path 30, the frequency of the pilot and the frequency of the carrier bearing a fixed ratio as will be disclosed in the description of the generator 32 in FIG. 2.

The demodulator 38, in accordance with the invention, comprises a pilot filter 42 for providing a coarse carrier reference, both inphase and quadrature components thereof, on lines 44-45, a carrier filter 46 which utilizes the reference on lines 44-45 for extracting the carrier from the spectrum of the voice modulated carrier to produce a fine carrier reference on line 48, and a phase locked loop 50 which utilizes the reference on line 48 to provide inphase and quadrature reference signals for demodulating respectively the inphase and quadrature voice components, shown in the graph 40, for providing the signals heard respectively from the speakers 26 and 28. A preamplifier 52 having a passband centered at the frequency of the pilot tone is utilized for amplifying the received pilot tone to a suitable amplitude for operation of the pilot filter 42. A second preamplifier 54 has a passband centered at the frequency of the carrier, the passband having sufficient width to pass the voice spectra for amplifying the modulated carrier to a suitable amplitude for operating the carrier filter 46 and for synchronous detection of the voice spectra by synchronous detectors 56 and 58 coupled respectively to the speakers 26 and 28.

Figure 2:
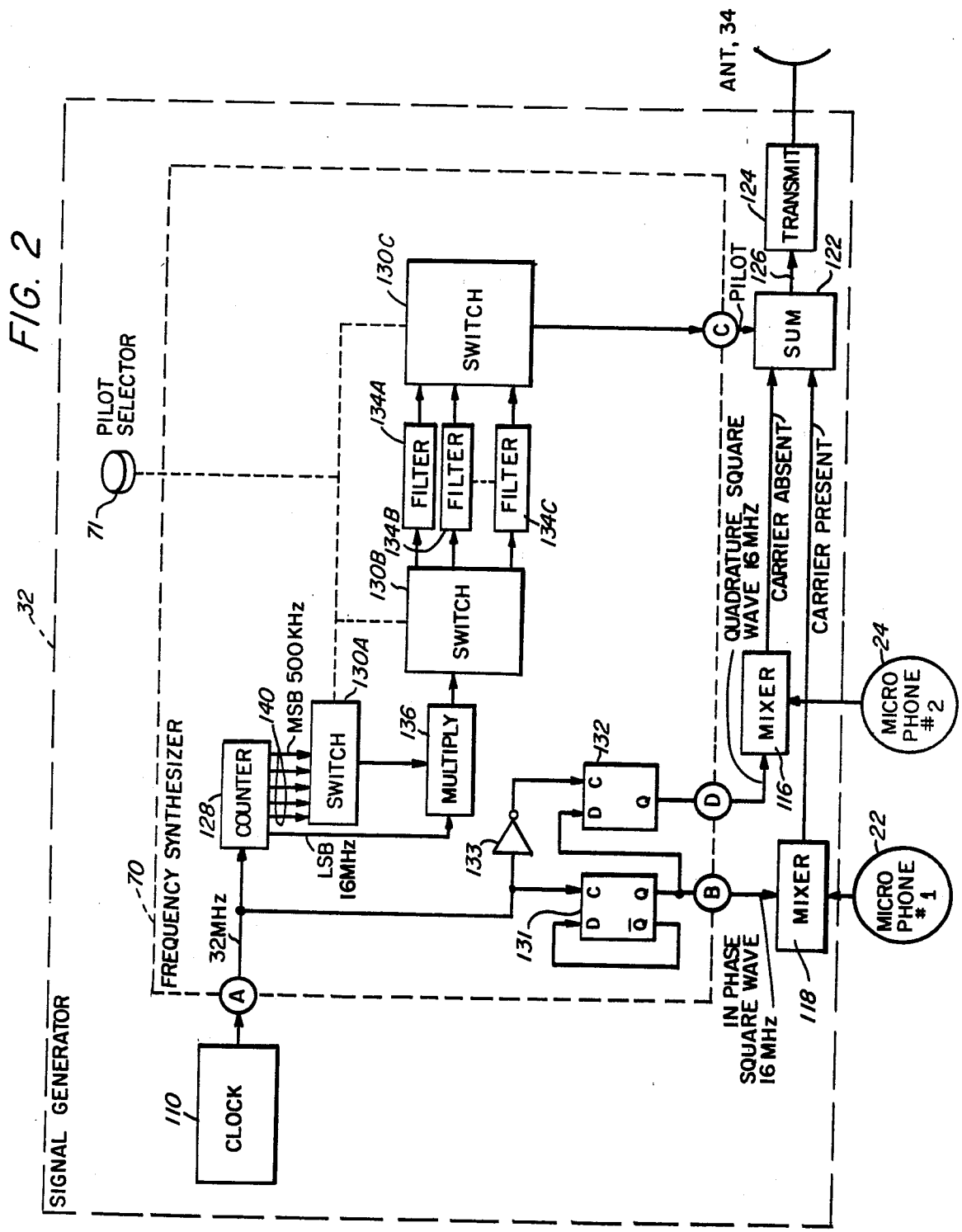
FIG. 2 is a block diagram of a signal generator of FIG. 1 showing a modulator for modulating a carrier with data bearing signals and a frequency synthesizer for providing a pilot tone, the frequency synthesizer also being utilized in a phase locked loop of the demodulator of FIG. 1 for generating a coarse carrier reference from the pilot tone.

The pilot filter 42 comprises a phase detector 60, a low pass filter 62, an oscillator 64 wherein the frequency of oscillation of its output signal on line 66 is controlled by the magnitude of a voltage appearing on line 68, and a frequency synthesizer 70 which produces the signals on lines 44-45 as well as a pilot tone replica on line 72 which have frequencies bearing a fixed ratio as selected by the knob 71 and as will be disclosed with reference to FIG. 2. The pilot filter 42 has the form of a phase locked loop wherein the detector 60 provides an error signal on line 74 which represents the difference in phase between the sinusoidal signals on lines 76 and 72, the pilot tone appearing on line 76 while a replica thereof appears on line 72. The response time of the synthesizer 70 is much faster than that of the filter 62 so that the loop stability and filtering characteristics are determined by the passband of the filter 62, the response time of the synthesizer 70 having essentially no effect on the frequency response of the loop of the pilot filter 42. The filter 62 filters the error signal on line 74 to provide the aforementioned voltage on line 68, the passband of the filter 62 being sufficiently wide to permit the pilot filter 42 to track phase perturbations in the pilot tone as may be produced by perturbations in the atmosphere surrounding the path 30.

The carrier filter 46 comprises multipliers 78, 80, 82 and 84, low pass filters 86 and 88, a summer 90, and a bandpass filter 92. Each of the multipliers 78, 80, 82 and 84 may comprise diode bridge circuits for accomplishing a multiplication of the pairs of input signals at their respective input terminals. Thus, for example, the multiplier 78 multiplies the signal on line 98 from the preamplifier 54 by the signal on line 44 with the filter 86 extracting the difference frequency component of the multiplication. Thereby, the multiplier 78 in combination with the filter 86 serves as a mixer for translating the signal on line 98 to ideally, zero frequency. Since the frequency of the reference signal on line 44 and that of the carrier spectral line on line 98 are essentially equal except for the effects of frequency dispersion along the path 30, the output signal of the filter 86 has a substantially constant amplitude which is then multiplied in the multiplier 80 by the reference signal on line 44 to produce a signal at the output of the multiplier 80 which includes a sinusoid having the frequency of the carrier. While the bandwidth of the pilot filter 42 is sufficiently wide to track phase and frequency perturbations of the pilot tone brought on by the perturbations in the atmosphere, the passband of the filter 86 need only be wide enough to pass variations in a difference in phase and frequency between the carrier spectral line on line 98 and the carrier reference on line 44 as is due to the dispersive properties of the atmosphere surrounding the path 30.

The multipliers 82 and 84 and the filter 88 function in a manner analogous to the multipliers 78 and 80 and the filter 86, the output signal of the multiplier 84 including a signal at the carrier spectral line which is in phase quadrature to the corresponding signal of the multiplier 80 due to the 90° phase shift between the lines 44 and 45. The output signals of the multipliers 80 and 84 are summed together by the summer 90 and filtered by the filter 92, the filter 92 having a passband sufficiently wide to pass the carrier spectral line while attenuating other products of the mixing operations. The bandwidth of each channel of the carrier filter 46, one channel having the filter 86 and the other channel having the filter 88, may be on the order of a Hertz to readily permit the extraction of the carrier spectral line from the amplitude modulated carrier even in those situations wherein the voice spectrum of the graph 40 lies within several Hertz of the carrier spectral line.

The phase locked loop 50 comprises a phase detector 100, a low pass filter 102, an oscillator 104 which functions in the same manner as does the oscillator 64, a digital inverter 105, and two edge-triggered, type-D flip-flops 106 and 108. The oscillator 104 produces a square wave signal which triggers the flip-flops 106 and 108, the flip-flop being triggered by the positive-going leading edge of the square wave while the flip-flop 106, which has its clock input complemented by the inverter 105, is triggered by the negative-going leading edge of the square wave. The respective output signals of the flip-flops 106 and 108 change state with each triggering of the respective flip-flops 106 and 108. Toggle operation of the flip-flop 108, wherein the output signal is complemented with each triggering by the input signal at terminal C, is accomplished by coupling the complemented output terminal $\overline{Q}$ to the D input terminal. The output signal of the flip-flop 106 is forced to follow that of the flip-flop 108 by coupling the output terminal Q of the flip flop 108 to the D input terminal of the flip flop 106. Thus, there appears at terminal B of the loop 50 a square wave having a frequency equal to one-half the frequency of the square wave produced by the oscillator 104. At terminal C of the loop 50, there appears a square wave having the same frequency as that at terminal B but being shifted in phase therewith by a quarter wavelength, equivalent to 90°. The phases of the signals at terminals B and A of the loop 50 are compared by the detector 100 which produces an error signal commensurate with the phase difference, the error signal being filtered by the filter 102 for controlling the frequency of the oscillator 104 so that the frequency of the signal at terminal B is equal to the frequency of the signal at terminal A, and that the phase of the signal at terminal B tracks the phase of the signal at terminal A and maintains a 90° phase difference therewith. Thereby, the carrier reference on line 48 is converted by the loop 50 to a pair of carrier reference signals at terminals B and C which differ in phase by 90°. The signals at terminals B and C are then utilized, as noted hereinabove, by the detectors 58 and 56 for synchronously detecting the inphase and quadrature components of the voice signal on line 98. To compensate for any phase shift introduced by the pilot filter 42, the carrier filter 46 and the phase locked loop 50, a phase shifter 109 is coupled between the carrier filter 46 and the phase locked loop 50 for adjusting the phase of the fine carrier reference on line 48 whereby the phases of the reference signals at terminals B and C are aligned with the phase of the carrier on line 98.

Referring now to FIG. 2, the signal generator 32 is seen to comprise a clock 110, a frequency synthesizer 70 including the knob 71 as disclosed in FIG. 1 for manual selection of a pilot tone two mixers 116 and 118, a summer 122 and a transmitter 124. The clock 110 produces a train of clock pulses which are coupled to terminal A of the synthesizer 70. In response to the clock pulses, the synthesizer 70 produces a square wave serving as a carrier at terminal B, a square-wave carrier in quadrature therewith at terminal D, and a pilot tone at terminal C. The carriers at terminals B and D are coupled respectively to the mixers 118 and 116, whereby the mixer 118 is driven in phase with the carrier at terminal B while the mixer 116 is driven in quadrature with the carrier at terminal B. The amplitude of the carrier of terminal B is modulated by the mixer 118 with the voice from the microphone 22, the mixer 118 producing a double sideband mixing with the carrier present in the output signal of the mixer 118. The carrier of terminal D is modulated with the voice of the microphone 24 by the mixer 116, the mixer 116 modulating the amplitude of the carrier to produce a double sideband suppressed carrier modulated signal at the output of the mixer 116. The output signals of the mixers 116 and 118 are then summed together with the pilot tone from terminal C by the summer 122 to produce a signal on line 126 having the signal format previously disclosed in the graph 40 of FIG. 1. The signal on line 126 is amplified by the transmitter 124 to a suitable level of power for transmission by the antenna 34 for propagation along the path 30 as was described hereinabove with reference to FIG. 1.

The synthesizer 70 comprises a counter 128, switches 130 A-C which are ganged together flip-flops 131 and 132, a digital inverter 133, a set of filters 134 of which individual ones thereof are further identified by the legends A, B..., and a multiplier 136. The counter 128 counts the clock pulses at terminal A, these clock pulses being produced for example, at a rate of 32 megahertz (MHz). A set of lines 140 couples the counter to the switch 130A and to the multiplier 136. Individual ones of the lines 140 are coupled respectively to individual stages of the counter 128, the least significant bit (LSB) occurring at a rate of 16 MHz and being applied via one of the lines 140 to the multiplier 136. The other ones of the lines 140 including the most significant bit (MSB), which is shown by way of example as occurring at a rate of 500 kilohertz (kHz), are seen to be coupled to the switch 130A. The signals on each of the lines 140 are in the form of square waves which are readily multiplied by the multiplier 136.

The square wave from terminal A is applied to the clock terminal of the flip-flop 131 and, via the inverter 133, to the clock terminal of the flip-flop 132, the flip-flops 131-132 functioning in the same manner as was described for the flip-flops 108 and 106 in FIG. 1 to provide inphase and quadrature square waves which serve as carriers for the mixers 118 and 116. The switches 130 A-C are operated by the knob 71, the switch 130A coupling the signal from an individual one of the lines 140 to the multiplier 136, the switch 130B coupling a signal from the output port of the multiplier 136 to a corrsponding one of the filters 134 while the switch 130C couples the corresponding one of the filters 134 via terminal C to an input port of the summer 122. The number of filters 134 is equal to twice the number of the lines 140 which are coupled to the switch 130A to capture upper and lower sideband signals of the multiplication operation of the multiplier 136.

Considering, by way of example, that the line 140 representing the MSB is coupled via the switch 130A to the multiplier 136, the multiplier 136 produces an output signal which is the product of the LSB multiplied by the MSB in this example. The product contains spectral lines for the upper and lower sidebands of the mixing operation at the frequencies of 16 MHz ± 500 kHz. The switches 130B and 130C select either the filter 134A for the upper sideband or the filter 134B for the lower sideband, respectively. Other ones of the filters 134 may be selected similarly for the upper and lower sideband frequencies resulting from the multiplication of the LSB by a signal on one of the lines 140. The selected spectral line from the product of the multiplier 136 which is coupled by the switch 130C to terminal C serves as the aforementioned pilot tone. The filters 134, by selecting either the upper or lower sideband spectral lines produced by the multiplier 136 permits the positioning of the pilot tone either above or below the frequency of the carrier. The knob 71 in the demodulator 38 of FIG. 1 and the knob 71 in the signal generator 32 of FIG. 2 are each set for the same pilot tone frequency so that the demodulator 38 can obtain the carrier frequency from that of the pilot tone.

It is understood that the above described embodiment of the invention is illustrative only and that modifications thereof may occur to those skilled in the art. Accordingly, it is desired that this invention is not to be limited to the embodiment disclosed herein but is to be limited only as defined by the appended claims.

What is claimed is:

1. A demodulator of a signal bearing data operative with a pilot tone lying outside the spectrum of said data signal, said demodulator comprising:

phase lock means for providing a first signal which is phase locked to said pilot tone, said phase lock means including frequency synthesizing means for generating a carrier reference signal having a frequency proportional to the frequency of said pilot tone;

means coupled to said reference signal for filtering said data signal to extract a carrier therefrom, the frequency of said reference signal approximating the frequency of said carrier, said filtering means including means for mixing said data signal with said reference signal to produce a first lower frequency signal, means for filtering said first lower frequency signal and means for mixing said first lower frequency signal with said reference signal to provide a first component of said carrier; and means coupled to said filtering means for providing signals bearing inphase and quadrature relationships to said reference signal, and means coupled to said inphase and quadrature signals for synchronously detecting said data signal.

2. A system according to claim 1 wherein said synthesizing means includes means coupled to said reference signal for shifting the phase of said reference signal by 90° to produce a second signal, said filtering means including means coupled to said phase shifting means for mixing said second signal with said data signal to produce a second lower frequency signal, a low pass filter for filtering said second lower frequency signal, means coupled to said low pass filter for mixing said second lower frequency signal with said second signal to produce a second component of said carrier in quadrature with said first component of said carrier, and means for summing together said first and second components of said carrier.

3. A system for communicating a data bearing signal, said system including a pilot tone positioned outside a spectrum of said data signal, said system comprising:

a frequency synthesizer for synthesizing a carrier signal and a pilot tone signal which bear a fixed frequency ratio, said synthesizing means including means for selecting a frequency bearing a fixed frequency ratio to the frequency of said carrier, means for selecting said ratio, and means for combining a signal at said frequency with said carrier to produce said pilot tone;

means coupled to a source of data and to said carrier for modulating said carrier with inphase and quadrature portions of said data;

means for transmitting the sum of said inphase and quadrature modulated components of said carrier with said pilot tone;

means for receiving said sum, said receiving means including a phase locked loop producing a signal which is phase locked to said pilot tone and a first reference signal which is at a fixed frequency ratio to said pilot tone, means for multiplying said sum by inphase and quadrature components of said first reference signal to produce inphase and quadrature products of said multiplication, means for filtering said products, means coupled to said filtering means for producing inphase and quadrature carrier reference signals, and means coupled to said produced inphase and quadrature carrier reference signals for synchronously detecting said sum to extract said data.

* * * * *